Nov. 14, 1961   S. V. MORRILL   3,008,751
PIPE PULLING CLAMPS
Filed April 21, 1958

INVENTOR.
KENNETH C. MORRILL, ADMIN.
OF
STANLEY V. MORRILL, DECS.
BY
ATTORNEY

United States Patent Office 3,008,751
Patented Nov. 14, 1961

3,008,751
PIPE PULLING CLAMPS
Stanley V. Morrill, deceased, late of 424 Broadway, Benton Harbor, Mich., by Kenneth C. Morrill, administrator, Benton Harbor, Mich.
Filed Apr. 21, 1958, Ser. No. 729,628
2 Claims. (Cl. 294—96)

This invention relates to improvements in pipe pulling clamps. The principal objects of this invention are:

First, to provide a pipe and rod pulling clamp which is easily adjustable to engage pipes and rods of different diameters and which exerts a positive gripping action on the pipe or rod when pulled longitudinally with respect to the rod.

Second, to provide a pipe pulling clamp which is easily releasable from the pipe with which it is engaged by releasing the pipe pulling tension on the clamp.

Third, to provide a pipe pulling clamp having teeth for positively engaging the pipe so arranged that release of the pipe pulling tension on the clamp exerts a transverse tooth disengaging force to release the clamp from the pipe.

Fourth, to provide a pipe pulling clamp which is strong and positive in its gripping action and easy to apply to and release from a pipe or rod.

Other objects and advantages of the invention will be apparent from a consideration of the following description and claims. The drawings, of which there is one sheet, illustrate a highly practical form of the clamp.

Figure 1:
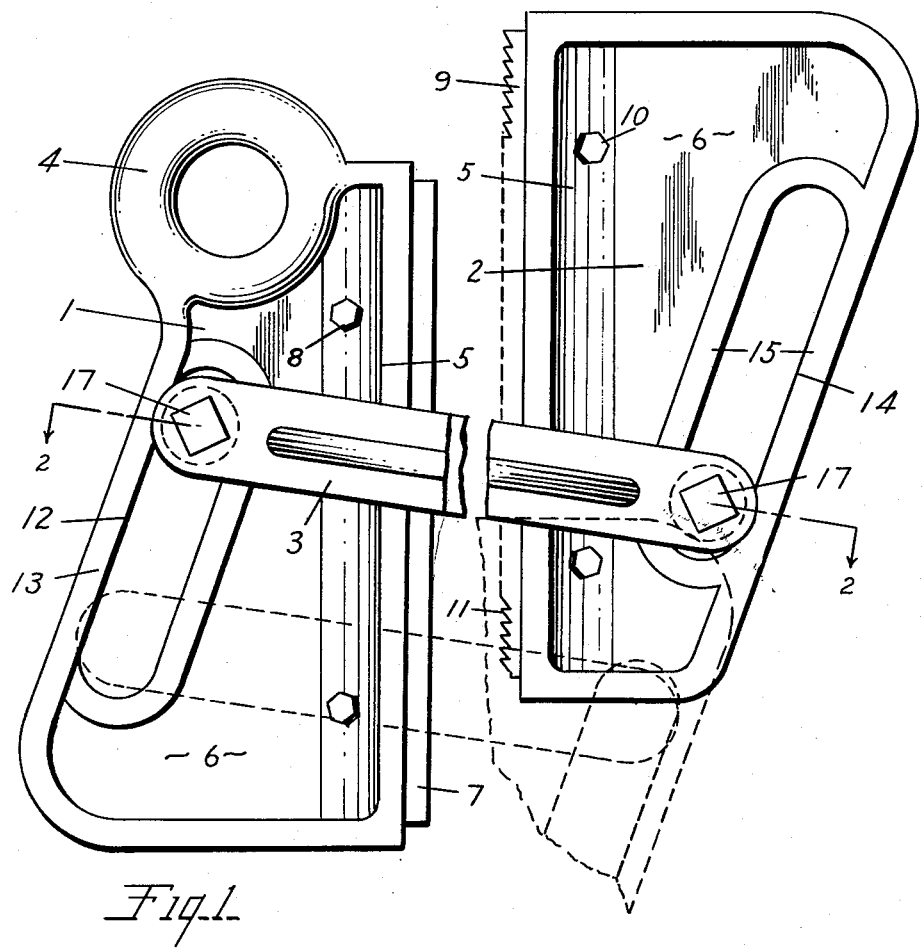
FIG. 1 is a side elevational view of the clamp in fully extended position with the fully closed position of the clamp parts indicated in dotted lines.

The clamp consists of a relatively fixed body member 1 and a relatively movable body member 2 connected by a pair of opposed connecting or tie bars 3. The body members are desirably formed as castings and the fixed body member 1 has an eye 4 formed in its upper end for attachment to a pulling chain or cable. The vertical inner or opposed edges of the body members 1 and 2 have angled jaws 5 formed therein with the base or apex of the jaws merging and connecting with central webs 6 of the body members. The jaws 5 of the fixed body member have an angled jaw plate 7 secured thereto by machine screws 8. The faces of the jaw plate 7 are desirably flat or smooth. The jaws 5 of the movable body member 2 have an angled jaw plate 9 secured thereto by machine screws 10. The faces of the jaw plate 9 are preferably roughened by transverse teeth 11 cut therein.

Figure 2:
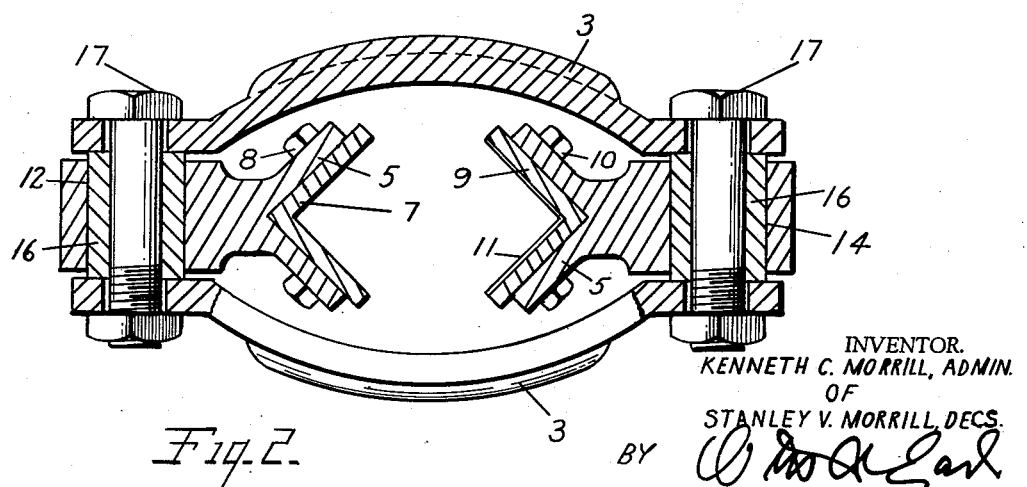
FIG. 2 is a transverse cross sectional view taken along the plane of the line 2—2 in FIG. 1.

The fixed clamp body 1 has a slot 12 formed therein and inclined downwardly and outwardly from the jaws 5 from underneath the eye 4. The slot 12 is defined by laterally projecting flanges 13 on the center web 6. The movable clamp body 2 has a slot 14 formed therein and inclined downwardly and inwardly toward the jaws 5 on the movable clamp. The slot 14 is defined by ribs 15 projecting laterally from the web of the clamp body. Movably positioned in the slots 12 and 14 are a pair of bushings 16 which project slightly beyond the edges of the flanges 13 and 15. The cross bars 3 are clamped to the ends of the bushings by bolts 17 passed through the ends of the bars and the bushings. As appears most clearly in FIG. 2, the cross bars 3 are oppositely outwardly bowed from the jaws 5 of the clamp bodies to embrace a pipe or rod engaged between the jaws of the clamp bodies.

In operation of the clamp the cross bars 3 can be moved to the upper end of the slot 12 in the fixed body 1 and to the bottom of the slot 14 in the movable body 2 as shown in full lines in FIG. 1. This gives a maximum opening between the jaws 5 and the jaw plates 7 and 9. Alternatively the cross bars may be moved to the bottom of the slot 12 and to the top of the slot 14 as shown by the dotted lines in FIG. 1 and this provides a minimum spacing between the bodies for engaging relatively small pipes and rods. Intermediate adjustments of the cross bars and body members are, of course, possible and maximum spacing of the clamp bodies in any adjusted position is obtained when the cross bars 3 are arranged perpendicularly to the slots 12 and 14. When the jaws 5 are engaged with the opposite sides of the pipe the slots 12 and 14 are generally parallel.

In any adjusted position of the clamp bodies and the cross bars 3 with the jaw plates 7 and 9 loosely engaged with the opposite sides of a pipe to be pulled, the first increment of upward motion of the fixed clamp 1 due to a tension force applied to the eye 4 tends to draw the clamp members together due to upward camming engagement of the edge of the slot 12 with the bushing and bolt positioned therein which imparts a transverse closing tension to the cross bars and also due to relative clockwise swinging motion of the cross bars which tends to close the gap between the jaws. The jaw plate 7 being smooth may move upwardly relative to the pipe but the teeth 11 on the fixed clamp 2 bite into the surface of the pipe and hold the movable clamp 2 relative to the pipe. An extremely strong gripping action is thus obtained with the clamp. When the pulling tension is relieved from the eye 4 the fixed clamp 1 descends due to its own weight and the smooth surface of the jaw plate 7. The teeth 11 tend to hold the movable clamp 2 in place. The downward and inward camming action of the edge of the slot 12 forces the cross bars 3 laterally inwardly so that the opposite ends acting on the edges of the slot 14 function to move the movable clamp 2 outwardly to disengage the teeth 11 from the pipe. The clamp thus quickly releases its grip on the pipe to permit lowering of the clamp for a succeeding pulling motion.

Having thus described the invention, what is claimed as new and is desired to secure by Letters Patent is:

1. A pipe pulling clamp comprising a first body member having its upper end adapted to be suspended from a pulling cable, a second body member opposed to said first body member, said body members having longitudinally downwardly extending transversely V-shaped jaws on their opposed edges, said first body member having a slot formed therein and angled downwardly and outwardly from the jaw portion of the first body member, said second body member having a slot formed therein and inclined downwardly and inwardly toward the jaw portion of said second body member, a bushing extending transversely through each of said slots and movable therealong, and tie bars extending between said body members and clamped at their ends to the ends of said bushings by bolts passed through the bars and the bushings.

2. A pipe pulling clamp comprising a first body member having its upper end adapted to be suspended from a pulling cable, a second body member opposed to said first body member, said body members having longitudinally downwardly extending transversely V-shaped jaws on their opposed edges, said first body member having a slot formed therein and angled downwardly and outwardly from the jaw portion of the first body member, said second body member having a slot formed therein and inclined downwardly and inwardly toward the jaw portion of said second body member, and a pair of tie bars extending between said body members on opposite sides thereof and secured together at their ends by bolts passed through the bars and said slots.

References Cited in the file of this patent

UNITED STATES PATENTS

| | | |
|---|---|---|
| 778,048 | Krebs | Dec. 20, 1904 |
| 1,430,783 | Berger | Oct. 3, 1922 |
| 1,938,485 | Cossor | Dec. 5, 1933 |
| 2,106,373 | Garriott | Jan. 25, 1938 |
| 2,550,424 | Penn | Apr. 24, 1951 |